(12) United States Patent
Simond

(10) Patent No.: US 6,621,051 B2
(45) Date of Patent: Sep. 16, 2003

(54) MIG WELDING TORCH RECONDITIONING APPARATUS

(75) Inventor: Alfred Robert Simond, Comber (CA)

(73) Assignee: Tweco Products, Inc., Wichita, KS (US)

(*) Notice: Subject to any disclaimer, the term of this patent is extended or adjusted under 35 U.S.C. 154(b) by 0 days.

(21) Appl. No.: 10/132,615

(22) Filed: Apr. 25, 2002

(65) Prior Publication Data

US 2002/0117490 A1 Aug. 29, 2002

Related U.S. Application Data

(62) Division of application No. 09/558,016, filed on Apr. 25, 2000, now Pat. No. 6,399,917.

(51) Int. Cl.⁷ .................................................. B23K 9/32
(52) U.S. Cl. ........................................ 219/136; 15/93.1
(58) Field of Search ............................. 219/136, 137.2; 118/72; 15/93.1; 269/126, 265, 278

(56) References Cited

U.S. PATENT DOCUMENTS

| 4,583,257 A | | 4/1986 | Bridges et al. |
| 4,682,487 A | | 7/1987 | Kaeseler |
| 4,702,195 A | | 10/1987 | Thielmann |
| 4,834,280 A | | 5/1989 | Thielmann |
| 4,835,851 A | * | 6/1989 | Peele et al. ............. 269/126 |
| 4,856,949 A | | 8/1989 | Shimada |
| 4,916,931 A | | 4/1990 | Kaeseler |
| 4,921,377 A | | 5/1990 | Hoch et al. |
| 5,138,969 A | | 8/1992 | Thielmann |
| 5,221,826 A | | 6/1993 | Lee et al. |
| 5,845,357 A | | 12/1998 | Anderson |
| 5,887,666 A | | 3/1999 | Chen et al. |
| 6,023,045 A | | 2/2000 | Mangelsen et al. |
| 6,295,708 B1 | | 10/2001 | Spaid et al. |

FOREIGN PATENT DOCUMENTS

| DE | 3332678 | * | 4/1985 |
| EP | 0090233 A1 | | 3/1983 |
| JP | 61-46377 | * | 3/1986 |
| WO | WO 99/33602 | | 12/1998 |

* cited by examiner

Primary Examiner—Clifford C. Shaw
(74) Attorney, Agent, or Firm—Senniger, Powers, Leavitt & Roedel

(57) ABSTRACT

A MIG welding torch reconditioning apparatus has a pneumatic supply line, vent means and a mechanical transmission shaft. The pneumatic supply line supplies air to the vent means for venting a directed debris-scattering air-flow against the transmission shaft proximal to exposed seals thereon. In another aspect, the apparatus has an in-line, direct-drive arrangement of a motor, a mechanical transmission shaft, and chuck means for receiving a reaming tool. Pneumatic lift means lifts the direct-drive arrangement into reaming tool engagement with the gas shield of a torch wherein the tool is operable to remove at least some of any back-splash deposits laid down on interior surfaces of the gas shield. A clamp is also provided for engaging a cylindrical body, such as a torch. The clamp includes a pair of generally orthogonally-offset faces of a "V"-block and respective gripping surfaces on gripping surface members of a pair of opposed jaws.

41 Claims, 8 Drawing Sheets

MIG WELDING TORCH RECONDITIONING APPARATUS

CROSS REFERENCE TO RELATED APPLICATION

This application is a divisional application of U.S. patent application Ser. No. 09/558,016, filed Apr. 25, 2000 now U.S. Pat. No. 6,399,917.

BACKGROUND OF THE INVENTION

The present invention relates to gas-shielded welding tip reconditioning apparatus, and particularly to improvements therein useful in robotic MIG welding operations.

"Welding" in the context of the present invention relates to the co-joining of two or more metal parts. The quality of the weld is affected by a number of factors, including the selection of any given welding technology, the competency of the operator, and of particular importance in the present context, the condition of the welding equipment. With regard to the condition of the equipment, the condition of the welding tip is often important. In the case of resistance welding equipment, for example, there are a variety of devices useful in connection with welding electrode maintenance—including surface reconditioning apparatus those disclosed in the following patents: U.S. Pat. No. 4,682,487; U.S. Pat. No. 4,856,949; U.S. Pat. No. 4,916,931; and U.S. Pat. No. 4,921,377.

Another well known welding technique is ARC welding—which differs from resistance welding in that ARC welding electrodes are deliberately consumed during the welding process so that the electrode material becomes an integral component of the finished weld. As a result, the problem of electrode reconditioning that is associated with resistance welding equipment, is not a problem in ARC welding.

MIG (and acronym for "metal-inert-gas") arc welding is an arc welding technique in which a relatively fine wire electrode is fed continuously from a large spool mounted on by a variable speed drive whose speed is controlled to optimize arc length and burnoff rate. During the welding process, the electrical arc that extends between the electrode and the metal surfaces that are being welded, is shielded within a gas flow. Typically argon or other gases having suitable characteristics, or mixtures thereof are used—with carbon dioxide often being the gas of commercial choice.

In gas shielded welding the wire electrode and the gas are generally channeled through a so-called "torch", which includes a central, electrically charged "tip". The tip directs the wire electrode toward the weld site, and a concentrically arranged metal gas shield (that is electrically insulated from the tip), acts as a hood to direct and maintain a coaxial flow of the inert gas in surrounding relation about the wire. The quality of the weld is contingent on both consistent and continuous gas flow and arc patterning. Anything that interferes with the gas flow or redirects or otherwise militates against the desired electrical arc pattern, will diminish the quality of the weld.

MIG welding, when properly executed, permits high welding speeds, and necessitates less operator training than is required in the case of other welding techniques. In applications where one or the other or both of these benefits are sought, the weld quality is especially sensitive to those variations that are attributable to adverse gas flow or anything which could negatively influence the desired arc pattern.

Gas flow in MIG welding can be adversely effected as a consequence of molten metal deposition. This arises as a result of backsplash splatter on the respective mutually opposed surfaces of the tip and the hood, within the interior of the torch.

Similarly, (since the dielectric strength of the gas flow is otherwise a constant), the accumulation of such backsplash splatter decreases the physical and hence "electrical" distance between the charged tip and the electrically insulated hood. If the distance decreases sufficiently, the voltage differential will exceed the dielectric strength of the intervening gas flow, and the arc will jump between the tip and the hood. This results in a diminished amount of electrical energy being delivered to the weld site and a concomitant compromise in weld quality.

In view of the foregoing, it is important that MIG welding torches be cleaned regularly, in order to avoid these two latter mentioned problems. A variety of devices are available for this purpose, and many if not most involve mechanical devices such as torch clamps and reaming tool drives, that can be exposed to and damaged by the debris that is dislodged from the torch. The present invention is intended to help remedy or at least reduce the incidence/severity of such damage.

SUMMARY OF THE INVENTION

In one aspect, a MIG welding torch reconditioning apparatus of the present invention generally comprises a pneumatic supply line; vent means; and a mechanical transmission shaft. The pneumatic supply line supplies air to the vent means for venting a directed debris-scattering air-flow against the mechanical transmission shaft proximal to exposed seals thereon.

In another aspect, the MIG welding torch reconditioning apparatus generally comprises a pneumatic supply line for supplying pneumatic rotary drive means and drive vent means for venting a directed debris-scattering air-flow towards a mechanical transmission shaft proximal to seals thereon. In yet another aspect, the MIG welding torch reconditioning apparatus generally comprises a pneumatic supply line for supplying pneumatic lift means and lift vent means for venting a directed debris-scattering air-flow towards a mechanical transmission shaft proximal to seals thereon.

In another aspect of the present invention, a MIG welding torch reconditioning apparatus generally comprises a pneumatic supply line; pneumatic lift means powered from said supply line and pneumatic rotary drive means powered from said supply line. A mechanical transmission shaft is connected in rotary driven relation to the drive means and is retractably extensible on operation of the lift means. An exhaust vent is supplied by at least one of air from the supply line, air exhausted from the lift means and air exhausted from the rotary drive means to vent a directed debris-scattering air-flow towards said transmission shaft proximal to seals thereon.

In still another aspect of the present invention, a MIG torch reconditioning apparatus generally comprises an in-line, direct-drive arrangement of a motor, a mechanical transmission shaft, and chuck means for receiving a reaming tool. Pneumatic lift means is provided to lift the direct drive arrangement into reaming tool engagement with a gas shield of a torch wherein the tool is operable to remove at least some of any back-splash deposits laid down on interior surfaces of the gas shield.

In another embodiment of the present invention, a clamp is provided for engaging a cylindrical body between a pair of generally orthogonally-offset faces of a "V"-block and respective gripping surfaces on gripping surface members of a pair of opposed jaws. The jaws are arranged on respective jaw pivots and also include respective lever arms which extend beyond the pivots. Each such lever arm supports respective cam followers in spaced apart relation from their respective jaw pivots. The clamp also includes movable cam surfaces which are adapted to act on the cam followers in such a way as to rotate the lever arms and associated jaws about their pivots. This translates in turn, into movement of the gripping surfaces in and out of a three-way engagement of the cylindrical body between said surfaces and the "V"-block (or more specifically, the above mentioned "faces" thereof.

DETAILED DESCRIPTION OF THE PREFERRED EMBODIMENT

Figure 1:
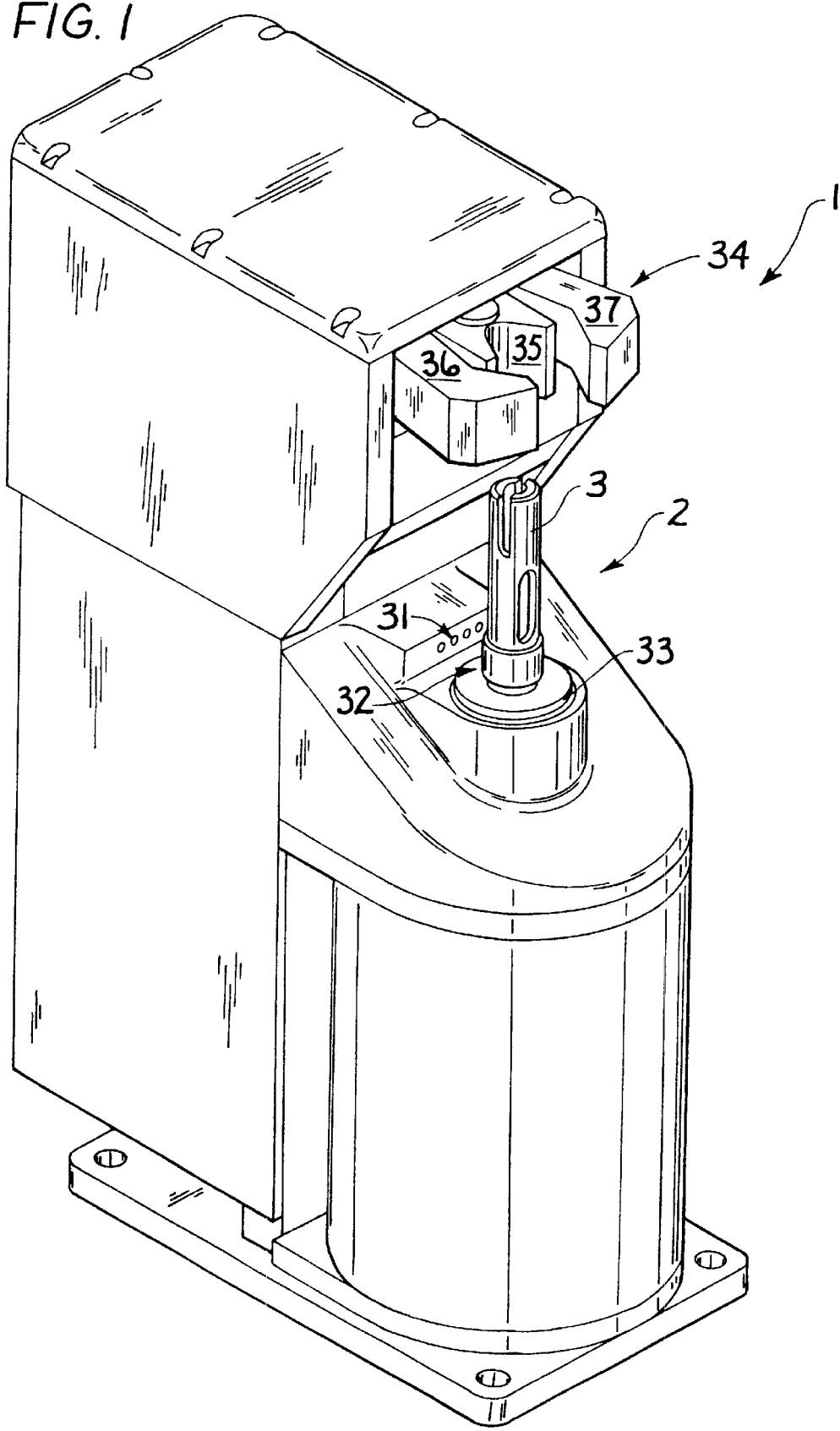
FIG. 1 of the appended drawings is a front-quarter perspective view of a preferred MIG welding torch reconditioning apparatus according to the present invention.
Figure 2:
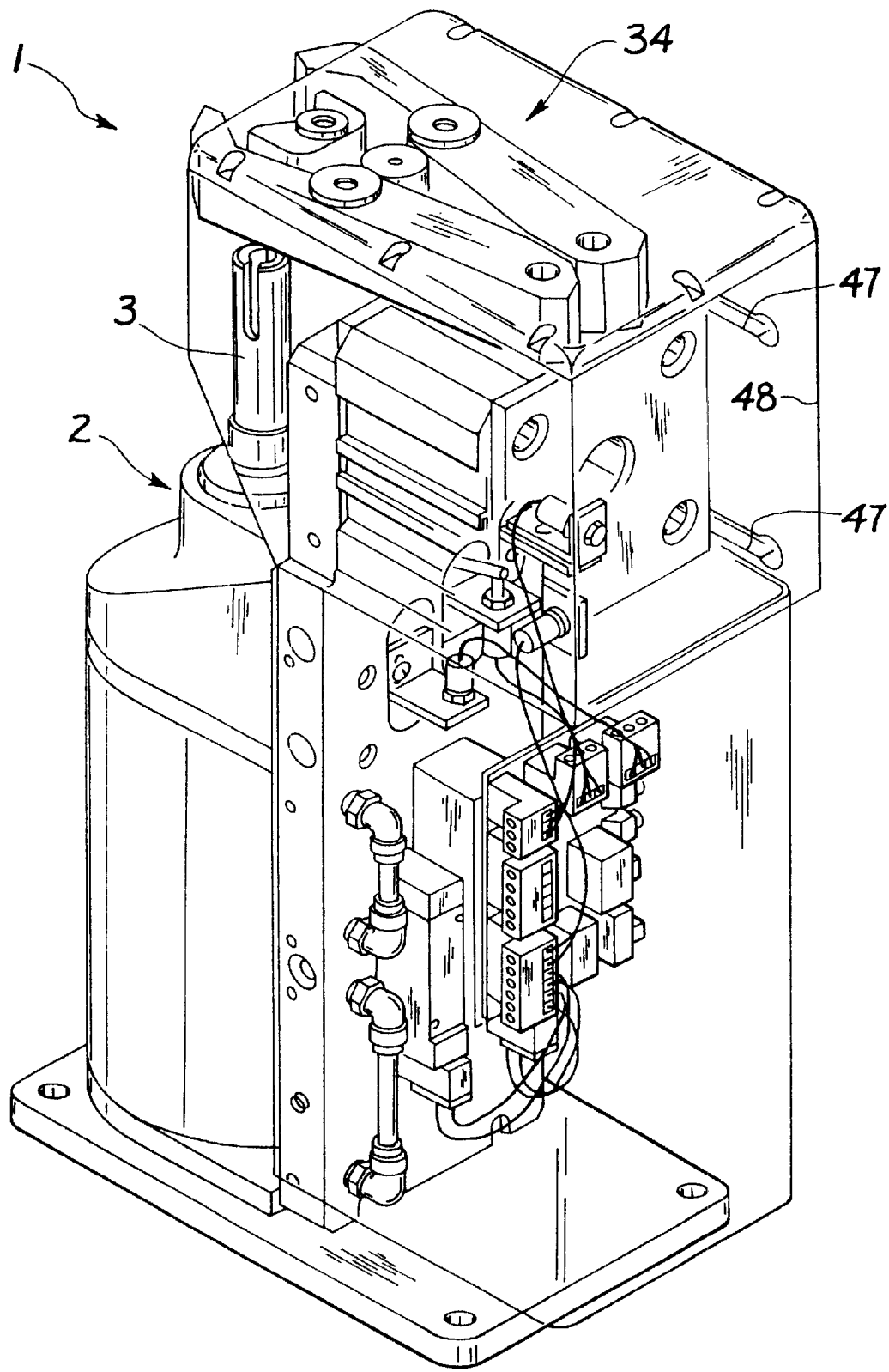
FIG. 2 is a view of the apparatus illustrated in FIG. 1, from a rear-quarter with the rear casing shown in partial phantom, to reveal interior workings of the apparatus.

Referring now to the appended Figures generally, (except as otherwise specified from time to time), there is depicted a preferred MIG welding torch reconditioning apparatus 1, embodying the present invention, and comprising a preferred torch reconditioning means that is indicated generally by reference numeral 2.

Torch reconditioning means 2 is adapted to hold a reaming tool 3, so that said tool can be aligned and inserted within a gas shield of a torch. The shield being designated by reference numeral 4 in FIG. 6. When so positioned, the tool is operable to remove at least some of any back-splash deposits laid down on the interior surfaces of shield 4.

In this preferred torch reconditioning means 2 the motor-driven reaming tool is operable in intermittently driven relation, such that when an incipient stall condition arises in which the torque available from the motor 5 is insufficient to properly rotate the reaming tool 3 against loads occasioned by contact between the reaming tool and welding deposits adhering to shield 4, then apparatus 1 responds by causing the motor 5 to discontinue driving the reaming tool until sufficient motive force can be brought to impact through the reaming tool and in turn against the contacted deposits, to allow the apparatus 1 to then return to normal reaming operation cycle.

Motor 5 is a pneumatic motor. Note that in an alternative embodiment of the present invention (not shown in the appended drawings), it is contemplated that the drive of the pneumatic motor could be suspended by a mechanism comprising feed-back operated valve in a pneumatic supply line to said motor, the said valve being operative in response to feed-back signaling an incipient stall condition. In operation, this would interrupt an air supply from driving the motor, and then suddenly reconnect the supply to provide sufficient motive force to impact (through the reaming tool) against the contacted deposits, to dislodge same under the suddenly applied force, and to allow the apparatus to return to normal reaming operational cycle. However, such an alternative embodiment is not presently preferred.

Instead, the mechanism of the presently preferred embodiment of the MIG welding torch recondition apparatus of the present invention comprises a clutch (indicated generally by reference numeral 6). Clutch 6 is provided to selectively uncouple and re-couple motor 5 from driving relation with reaming tool 3. In this way, clutch 6 is operable when motor 5 encounters incipient stall conditions to respond to the incipient stall condition by uncoupling the motor from the reaming tool, causing motor 5 to discontinue driving the reaming tool until sufficient motive force can be brought on by the re-coupling of the clutch 6 to impact through the reaming tool 3 and in turn against the contacted deposits, to dislodge same and allow the apparatus to return to normal reaming operational cycle.

Although the clutch could be mechanical, electrical or hydraulic in nature, clutch 6 is preferably mechanical, as shown. More particularly, in accordance with the depicted preferred embodiment of the present invention, clutch 6 is operable under incipient stall conditions, such that the motor rotates the drive side of the clutched coupling between the motor 5 and reaming tool 3, under unloaded-motor conditions. This mode of operation continues until the drive coupling re-couples through complementary mating surfaces (referenced generally at 7) thereof (i.e. of clutch 6) to thereby transmit the resulting rotary-impact force through a simple and direct coupling (see for example, FIG. 3 of the appended drawings) with rotatable mechanical transmission shaft 12 to the reaming tool 3 and against any contacted deposits.

Accordingly, in this particular embodiment of the present invention, clutch 6 includes a mechanical impact-clutch intermittent drive coupling 8 that is arranged intermediate between motor 5 and reaming tool 3. As mentioned above, this arrangement is operable to uncouple a reaming tool transmission side (indicated generally by 8a) of coupling 8 from a motor-powered drive side (indicated generally by 8b) thereof. When, in the course of a normal operational cycle, the torque available from motor 5 is insufficient to properly rotate the reaming tool against loads occasioned by contact of the reaming tool against welding deposits within the shield 4, the motor rotates the drive side of the coupling under unloaded-motor conditions until the drive coupling re-couples through complementary mating surfaces thereof to thereby transmit the resulting impact force through the reaming tool and against and contacted deposits.

In accordance with the preferred aspects of the present invention as embodied in the illustrated features herein, motor 5 is a pneumatically driven motor; and both the coupling 8 and motor 5 are reversibly operable.

As regards impact mating surfaces 7, these are comprised of complementary hammer 9 and reception block 10 surfaces of coupling 8.

Impact drive devices are generally known—including that disclosed in U.S. Pat. No. 5,887,666 which is incorporated herein by reference. The impact drive illustrated in the appended drawings was obtained from Campbell Hausfeld, of Harrison, Ohio.

Figure 3:
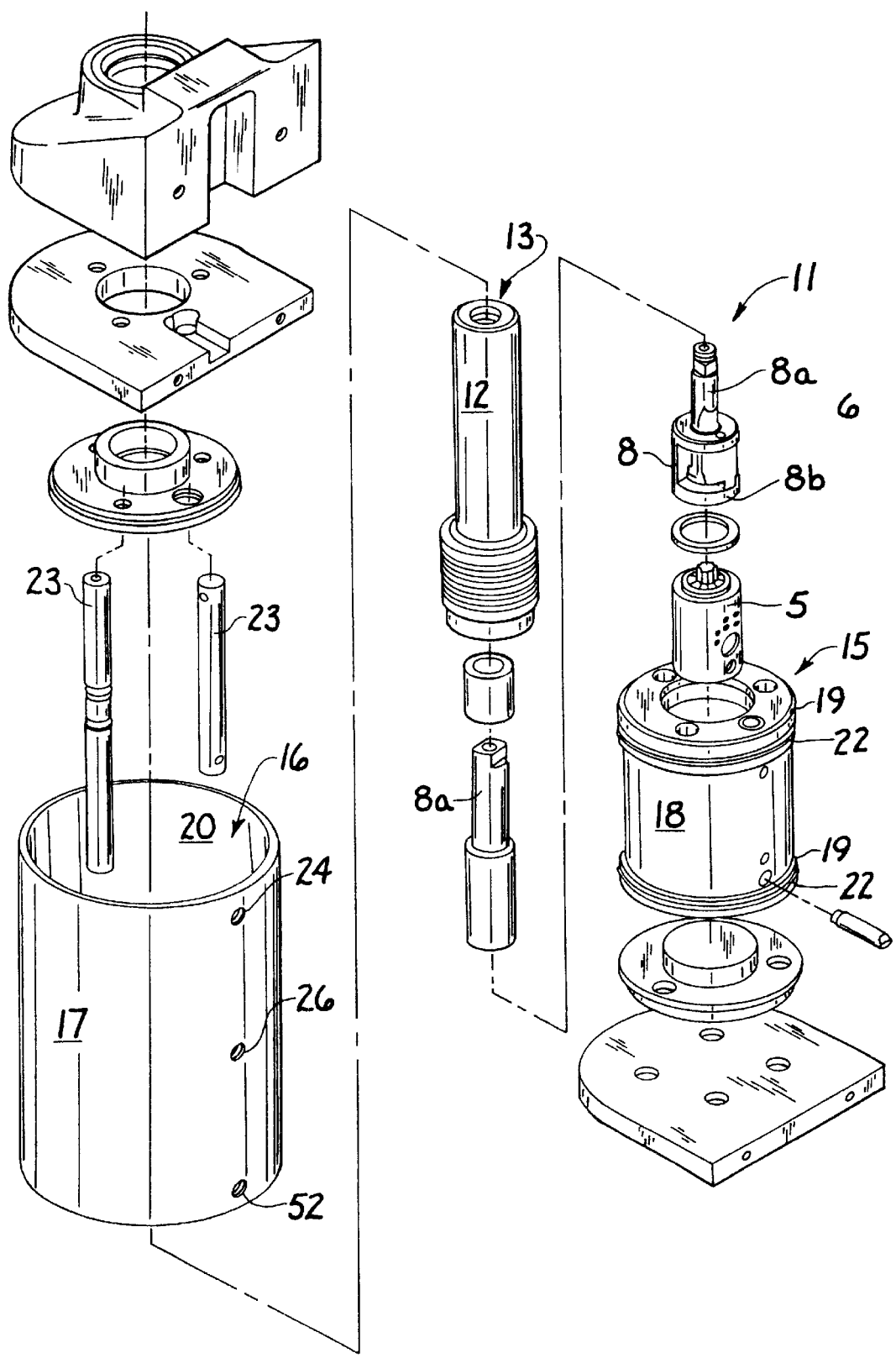
FIG. 3 is an exploded view of drive components as arranged within the embodiment depicted in FIGS. 1 and 2.
Figure 5:
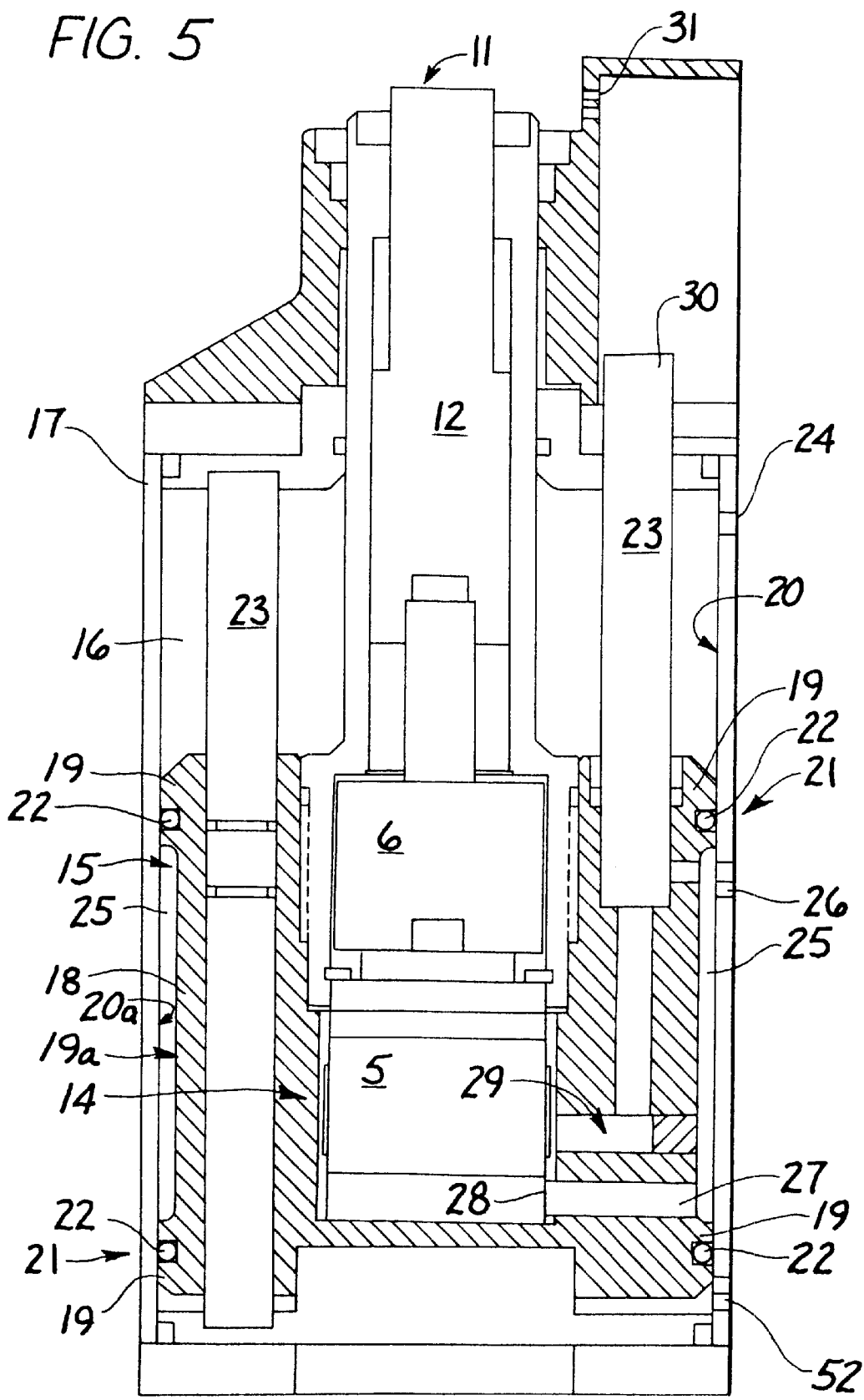
FIG. 5 depicts a preferred lift mechanism in accordance with the embodiment depicted in the preceding figures.

Referring now in particular, but not exclusively, to FIGS. 3 and 5 of the appended drawings, there is illustrated a MIG torch reconditioning apparatus 1 comprising an in-line, direct-drive arrangement 11, of a motor 5, a mechanical transmission shaft 12, and chuck means 13 for receiving a reaming tool 3. Pneumatic lift means 14 is provided to lift the direct drive arrangement 11 to engage reaming tool 3 with torch gas shield 4, so that tool 3 is operable to remove at least some of any back-splash deposits laid down on interior surfaces of gas shield 4.

Direct-drive arrangement 11 is movably arranged as a piston 15 within a channel 16 in a housing 17, and said pneumatic lift means 14 is operable to introduce a supply of air under pressure into channel 16 to move piston 15 therein. Direct-drive arrangement 11 includes a cradle 18 for supporting pneumatic motor 5 within channel 16. Cradle 18 comprises surfaces 19 adapted to cooperate with interior channel (16) surfaces 20 of housing 17, to form sliding air-tight seals 21 there-between. These include sealing rings 22.

In this preferred embodiment, channel 16 is cylindrical and cradle 18 is mounted in slidably positionable relation along an at least one guide rail 23 that is arranged within channel 16 and parallel to the channels longitudinal axis. Rail (or rails, as in the present case) 23, is offset from direct drive arrangement 11 and operable to resist rotation of cradle 18 within channel 16. Additionally, MIG torch reconditioning apparatus 1 further includes pneumatic retractor means (including pneumatic inlet 24 into housing 17) operable under pneumatic control to retract direct drive arrangement 11 from out of reaming tool engagement within torch gas shield 4 after tool 3 has removed at least some of any back-splash deposits laid down on interior surfaces thereof.

Cradle 18 comprises two, mutually spaced apart, sealing surfaces 21 defining a space 25 there-between which is otherwise bounded by adjacent cradle and channel surface (reference numerals 19 and 20, respectively) portions 19a and 20a. A pneumatic inlet 26 through housing 17 communicates into space 25, and cradle 18 includes a pneumatic passage 27 communicating between space 25 and an air inlet 28 into pneumatic motor 5. Air supplied through housing inlet 26 is delivered to motor 5 through space 25 and passage 27 throughout a range of cradle positions over which inlet 26 is in register between respective top and bottom sealing surfaces 21. Cradle 18 includes a port 29 for exhausting drive air from motor 5. Port 29 comprises a telescoping snorkel 30 that is adapted to channel drive air exhaust exteriorly of housing 17.

In accordance with the present invention, MIG welding torch reconditioning apparatus 1 includes vent means 31 for venting a directed debris-scattering air-flow from housing 17 and against a portion 32 of the mechanical transmission shaft proximal to exposed seals 33 thereon. Portion 32 of the transmission shaft is an extensible rotary drive shaft, adapted to be retractably extended past seals 33 to position reaming tool 3 within shield 4.

As illustrated in FIG. 5, the pneumatic inlet 26, space 25, pneumatic passage 27, air inlet 28, port 29 and snorkel 30 broadly define a pneumatic supply line for directing debris-scattering air-flow to the vent means 31. However, it is understood that the pneumatic supply line may be a direct flow path from the inlet 26 to the vent means 31, bypassing the motor 5, or any other indirect flow path that directs air from the inlet 26 to the vent means 31. It is also contemplated that the pneumatic supply line may include a passage 52 through which air is delivered to the pneumatic lift means 14 for driving the lift means, and may further include an exhaust vent (not shown) for exhausting air from the lift means and directing the air to the vent means 31.

Figure 6:
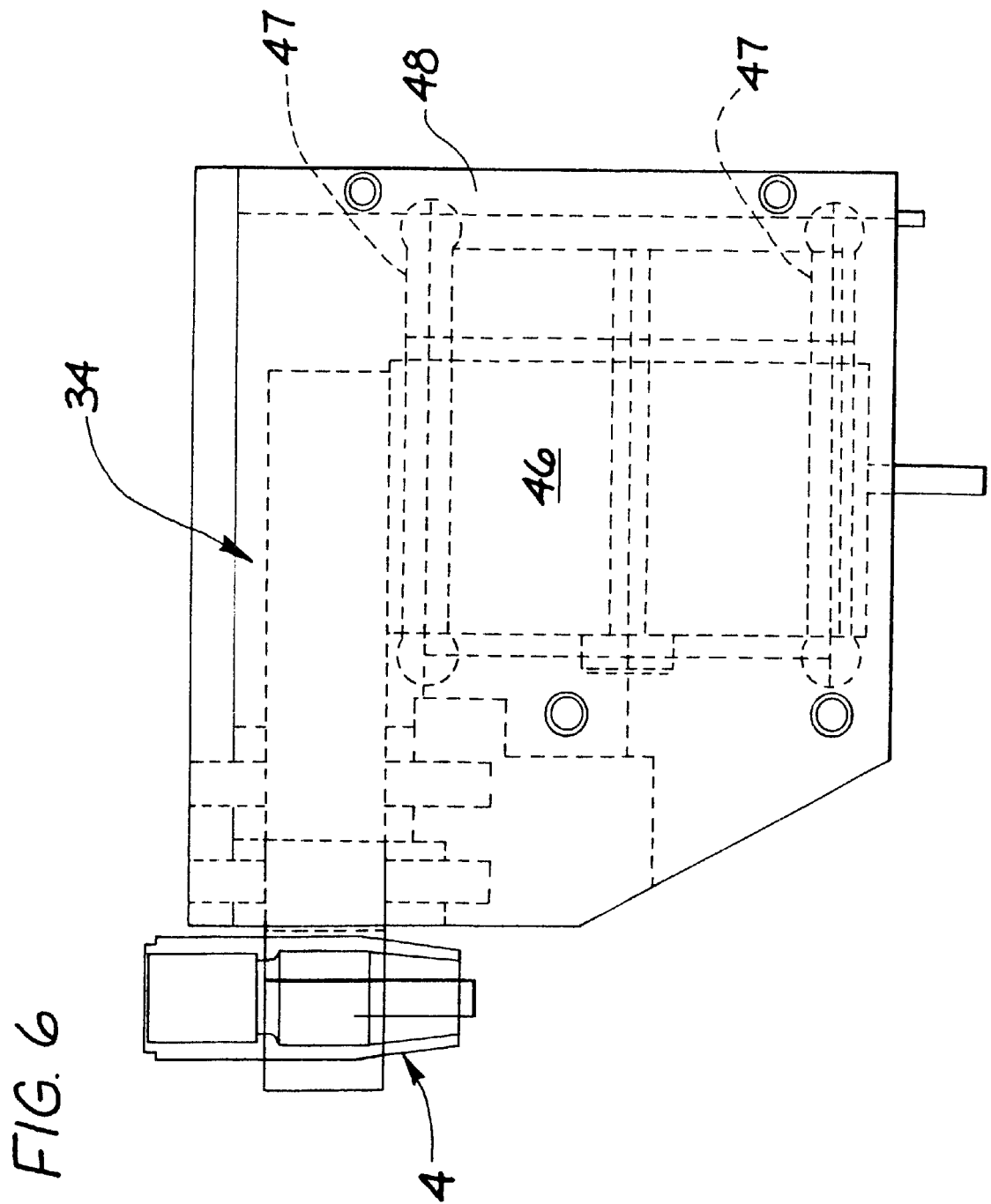
FIG. 6 depicts an elevated side view of the clamping mechanism that is adapted to engage a welding torch.
Figure 7:
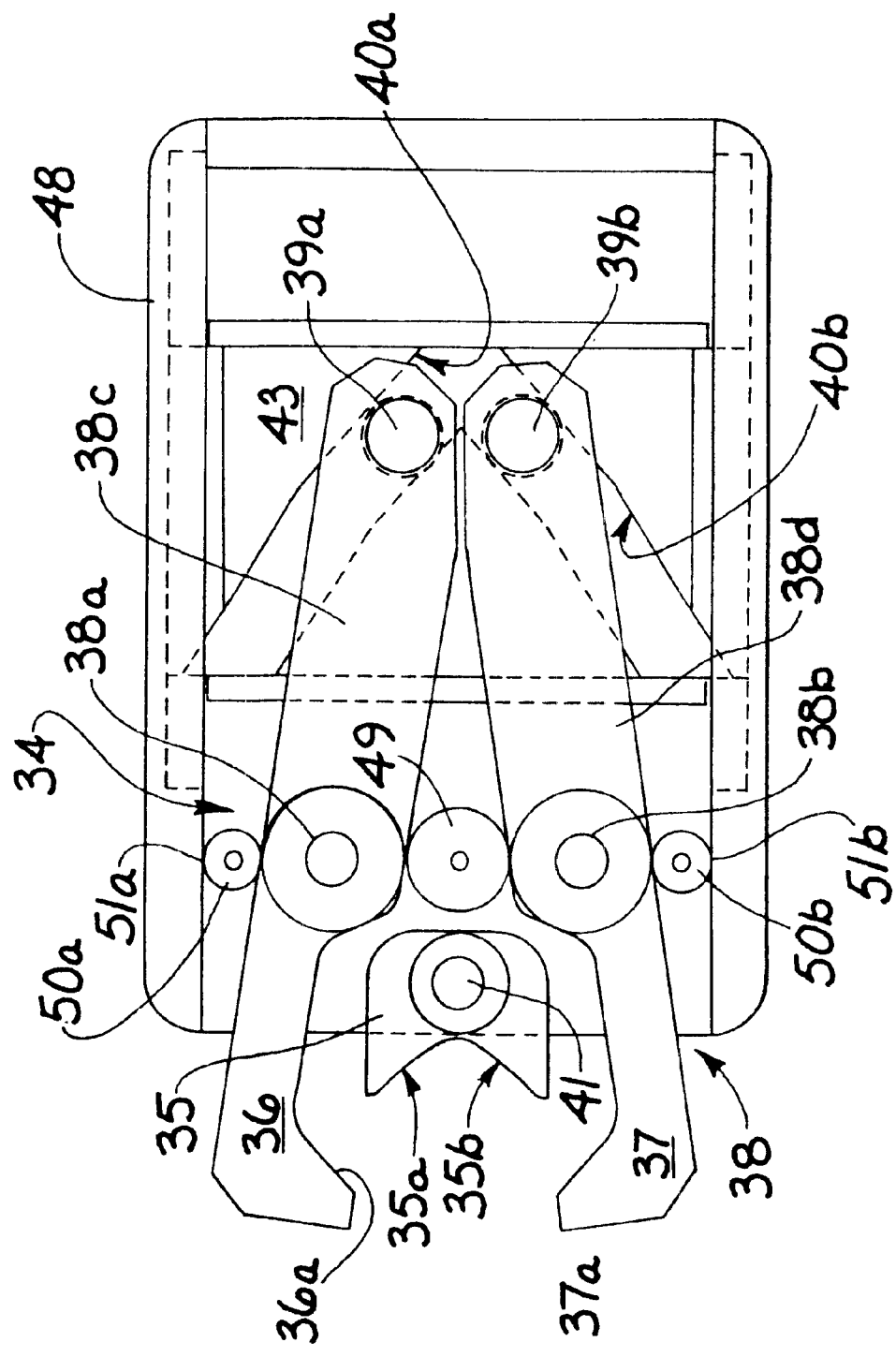
FIG. 7 depicts a top down view of the clamping mechanism shown in FIG. 6.
Figure 8A:
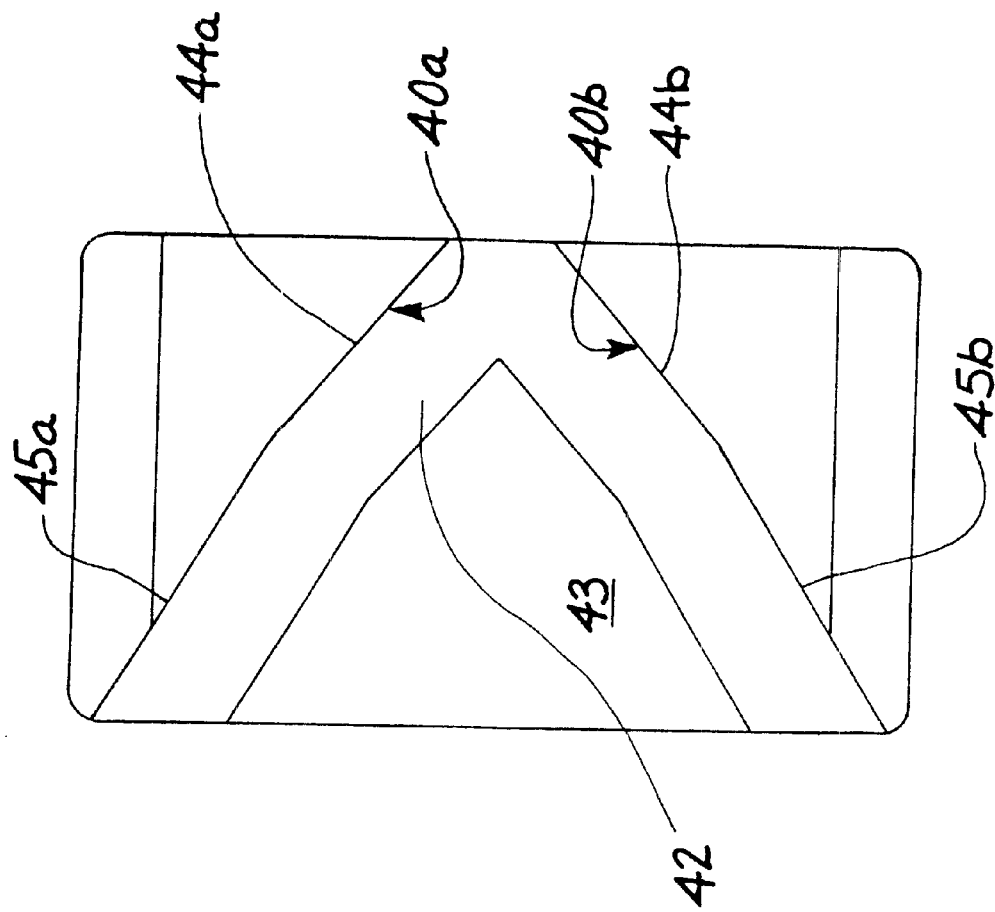
FIGS. 8a and 8b depict end and top views of portions of the clamping mechanism.
Figure 8B:
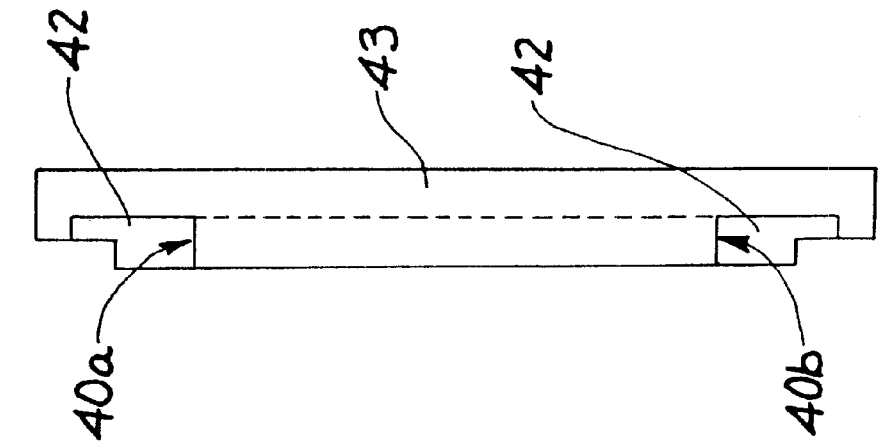

Referring now to FIGS. 6, 7 and 8 in particular, although not exclusively, there is depicted a clamp 34 for engaging a cylindrical body (e.g. the torch shield 4) between a pair of generally orthogonally-offset faces 35a and 35b of a "V"-block 35 and respective gripping surfaces 36a and 37a on gripping surface members 36 and 37 (respectively) of a pair of opposed jaws 38. Jaws 38 are arranged on respective jaw pivots 38a and 38b. Jaws 38 further include respective lever arms 38c and 38d extending beyond pivots 38a and 38b. Each lever arm (38c and 38d) support respective cam followers 39a and 39b in spaced apart relation from their respective jaw pivots 38a and 38b. Clamp 34 further includes movable cam surfaces 40a and 40b which are adapted to act on cam followers 39a and 39b to rotate lever arms 38c and 38d and associated jaws 38 about pivots 38a and 38b to move gripping surfaces 36a and 37a in and out of a three-way engagement in which the cylindrical body of torch shield 4 is engaged between surfaces 36a and 37a and orthogonal faces 35a and 35b of "V"-block 35.

Note that respective ones of the orthogonally-offset faces 35a and 35b is arranged in generally parallel, mutually-opposed relation to a corresponding gripping surface 36a and 37a, and that "V"-block 35 is mounted on a "V"-block pivot 41 around which "V"-block 35 is rotatable. This arrangement permits the cylindrical body of torch shield 4 to be engaged in self-centering relation by clamp 34.

Also note that cam surfaces 40a and 40b are side walls of a milled track 42 that is arranged in a slide plate 43. Slide plate 43 is selectively movable between positions corresponding to said gripping surfaces being, respectively, in and out of the above mentioned three-way engagement with the torch shield 4.

Track 42 is milled in such a way that the cam surfaces comprise primary portions 44a and 44b respectively, that are configured to translate (through cam followers 39a and 39b and lever arms 38c and 38d), to rapidly move jaws 38 towards engagement with a certain but relatively lower, mechanical advantage. Cam surfaces also comprise secondary portions, 45a and 45b, that are configured to translate through motion to more slowly move jaws 38 into engagement, with relatively greater mechanical advantage.

Plate 43 is selectively driven on a pneumatic piston, 46, which travels along rails 47 milled into housing 48. Plate 43, lever arms 38c and 38d, and cam followers 39a and 39b are enclosed within housing 48, while "V"-block 35 and gripping surface members 36 and 37, are all arranged externally thereof. A central resilient cylindrical seal 49 is arranged generally tangentially against jaws 38, between jaw pivots 38a and 38b, to thereby reduce ingress of debris into the interior of housing 48. In addition, respective ones of outboard cylindrical seals 50a and 50b are arranged generally tangentially between corresponding ones of jaws 38, and adjacent portions 51a and 51b of housing 48, to thereby further reduce ingress of debris into housing 48.

In general operation, (and referring to the drawings in general) torch shield 4 is approximately positioned relative to apparatus 1, (and under robotic welder control), for cleaning in accordance with some predetermined schedule or other direct or indirect criteria for maintaining welding performance. With torch shield 4 so positioned, pneumatic piston, 46 is actuated (in response to control signals not detailed herein—but for which the programming and mechanisms are generally well known in the relevant arts), and begins its transit along rails 47, carrying plate 43 along with it.

As plate 43 moves, portions 44a and 44b of the cam surfaces 40a and 40b of milled track 42, act against cam followers 39a and 39b. The resulting movement of cam followers 39a and 39b then in turn translates into initial and relatively rapid movement of lever arms 38c and 38d about pivots 38a and 38b—and corresponding movement of the balance of jaws 38 translates into movement of members 36 and 37 such that gripping surfaces 36a and 37a advance towards respective offset faces 35a and 35b, with torch shield 4 interposed there between. This action continues until piston 46 extends to the point where cam followers 39a and 39b begin to track against respective secondary surface portions 45a and 45b. The change in the rate of displacement of the cam followers 39a and 39b as they track along these secondary surface portions 45a and 45b, reduces the rate of rotation of jaws 38 about jaw pivots 38a and 38b—slowing the progress of the gripping surfaces in the direction of shield 4, but increasing the relative mechanical advantage with which these surfaces engage shield 4.

Ultimately shield 4 is brought into contact with surfaces 35a and 35b, during which time "V"-block 35 rotates passively to receive and position shield 4 into the requisite alignment above reaming tool 3. Clamp 34 completes its engagement and holds shield 4 in clamped relation between the respective faces of "V"-block 35 and surface members 36 and 37 of jaws 38, throughout the balance of the reaming operation.

With shield 4 aligned and clamped, the pneumatic supply line provides an air flow into pneumatic inlet 26 (which extends through housing 17) and from there into space 25. The air then flows from space 25 though a pneumatic passage 27 in cradle 18, and from there into air inlet 28 to drive pneumatic motor 5, which in turn spins reaming tool 3. Air is also supplied through passage 52 to drive pneumatic lift means 14, lifting piston 15 within channel 16 of housing 17, to extend reaming tool 3 into the interior of shield 4. During the reaming operation, spent air is vented from motor 5, through passage 29 and snorkel 30 and ultimately through vent means 31, to prevent accumulation of seal damaging debris on transmission shaft seals.

Figure 4A:
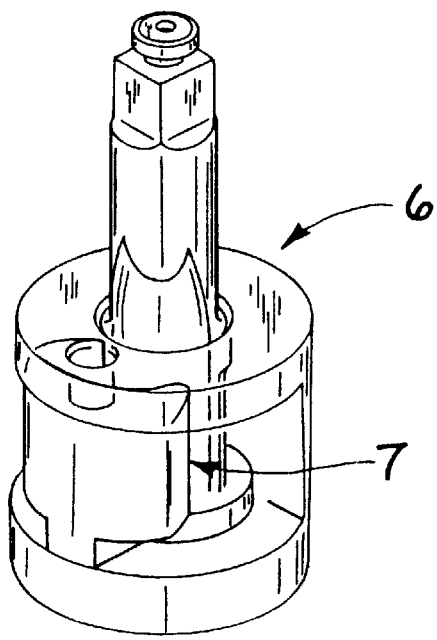
FIGS. 4a, 4b and 4c, depict an impact drive mechanism in various drive states.
Figure 4B:
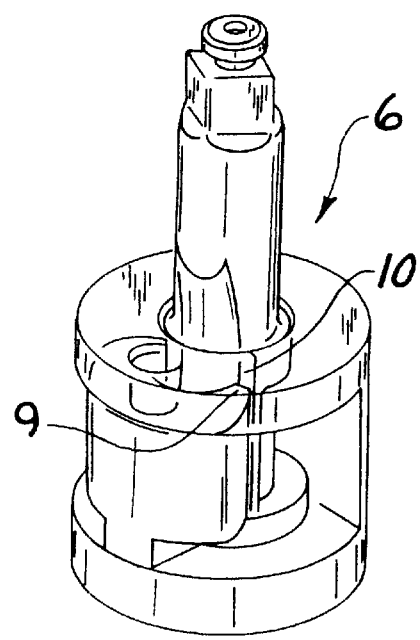
Figure 4C:
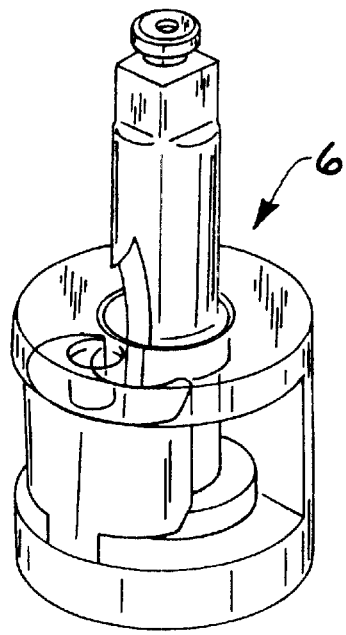

In addition, and also during the reaming operation, the impact drive cuts in under incipient stall conditions. In such circumstances, the mechanical impact-clutch intermittent drive coupling 8 operates to uncouple a reaming tool transmission side (indicated generally by 8a) of coupling 8 from a motor-powered drive side (indicated generally by 8b) thereof. Referring now in particular to FIGS. 4a, 4b and 4c, there is shown views of the coupling 8 in pre-impact, impact and post-impact positions, respectively.

Once the reaming activity is completed, clamp 34 releases shield 4, and the robotic welding control takes over in returning the torch to productive application.

Other variations on the present invention will be apparent to persons skilled in the art(s) in view of the disclosure and teachings contained herein or following here-from, and the scope of the present invention is therefore constrained only by the definitions thereof as provided in the claims that ultimately issue on the basis hereof.

What is claimed is:

1. A MIG welding torch reconditioning apparatus including a pneumatic supply line; vent means; and a mechanical transmission shaft, wherein said pneumatic supply line supplies air to said vent means for venting a directed debris-scattering air-flow against said mechanical transmission shaft proximal to exposed seals thereon.

2. The MIG welding torch reconditioning apparatus according to claim 1, wherein said pneumatic supply line is adapted to supply pneumatically driven mechanical means, and to vent air from said mechanical means, through said vent means.

3. Apparatus as set forth in claim 1 wherein the motor is a pneumatically driven motor and at least partially defines said gas flow path whereby pressurized gas exhausted from the motor is directed against said portion of the transmission shaft.

4. A MIG welding torch reconditioning apparatus including a pneumatic supply line for supplying pneumatic rotary drive means and drive vent means for venting a directed debris-scattering air-flow towards a mechanical transmission shaft proximal to seals thereon.

5. The MIG welding torch reconditioning apparatus according to claim 4 wherein said transmission shaft is a rotary drive shaft arranged in driven relation with said pneumatic drive means, and in driving relation with a reaming tool to be aligned and inserted within a torch's gas-shield and to be operable therein to remove at least some of any back-splash deposits laid down on interior surfaces of said gas-shield.

6. The MIG welding torch reconditioning apparatus according to claim 5, wherein said transmission shaft is an extensible rotary drive shaft, adapted to be retractably extended past said seal to position said reaming tool within said gas shield.

7. A MIG welding torch reconditioning apparatus including a pneumatic supply line for supplying pneumatic lift means and lift vent means for venting a directed debris-scattering air-flow towards a mechanical transmission shaft proximal to seals thereon.

8. The MIG welding torch reconditioning apparatus according to claim 7, wherein said transmission shaft is an extensible shaft, adapted to be retractably extended past said seals to position a reaming tool within a gas shield.

9. The MIG welding torch reconditioning apparatus according to claim 8, wherein said transmission shaft is a rotary drive shaft arranged in driving relation with a reaming tool to be aligned and inserted within a torch's gas-shield and to be operable therein to remove at least some of any back-splash deposits laid down on interior surfaces of said gas-shield.

10. A MIG welding torch reconditioning apparatus comprising: a pneumatic supply line; pneumatic lift means powered from said supply line, pneumatic rotary drive means powered from said supply line; a mechanical transmission shaft that is connected in rotary driven relation to said drive means and is retractably extensible on operation of said lift means; and, an exhaust vent supplied by at least one of air from said supply line, air exhausted from said lift means and air exhausted from said rotary drive means to vent a directed debris-scattering air-flow towards said transmission shaft proximal to seals thereon.

11. The MIG welding torch reconditioning apparatus according to claim 10, wherein said exhaust vent is supplied by exhausted air from said rotary drive means.

12. A MIG torch reconditioning apparatus operable to remove at least some of any back-splash deposits laid down on interior surfaces of a gas shield, said reconditioning apparatus comprising an in-line, direct-drive arrangement of a motor, a mechanical transmission shaft, and chuck means for receiving a reaming tool, wherein said direct-drive arrangement is movably arranged as a piston within a channel in a housing, and a pneumatic lift means operable to introduce a supply of air under pressure into said channel to move said piston arrangement to lift said direct drive arrangement into reaming tool engagement with a torch's gas shield, wherein said direct-drive arrangement includes a cradle for supporting said motor within said channel, and wherein said cradle comprises surfaces adapted to cooperate with interior channel surfaces of said housing, to form a sliding air-tight seal there-between.

13. The MIG torch reconditioning apparatus according to claim 12, wherein said motor is a pneumatic motor.

14. The MIG torch reconditioning apparatus according to claim 12, wherein said cradle surfaces include sealing rings.

15. The MIG torch reconditioning apparatus according to claim 12, wherein said channel is cylindrical and said cradle is mounted in slidably positionable relation along an at least one guide rail arranged within said channel, parallel to said channels longitudinal axis, and wherein said rail is offset from said direct drive arrangement and operable to resist rotation of said cradle within said channel.

16. The MIG torch reconditioning apparatus according to claim 12, further including pneumatic retractor means operable to retract said direct drive arrangement from out of reaming tool engagement within said torch's gas shield after said tool has removed at least some of any back-splash deposits laid down on interior surfaces of said gas shield.

17. The MIG torch reconditioning apparatus according to claim 12, wherein said cradle comprises at least two, mutually spaced apart sealing surfaces defining a space there-between which is otherwise bounded by adjacent cradle and channel surface portions, and wherein a pneumatic inlet through said housing communicates with said space, and wherein said cradle includes a pneumatic passage communicating between said space and an air inlet into said pneumatic motor, and whereby air supplied through said housing inlet is deliverable to said motor through said space and said passage over a range of positions in which said inlet is in register between said spaced apart sealing surfaces.

18. The MIG torch reconditioning apparatus according to claim 12, wherein said cradle includes a port for exhausting drive air from said motor.

19. The MIG torch reconditioning apparatus according to claim 18, wherein said port comprises a telescoping snorkel adapted to channel drive air exhaust exteriorly of said housing.

20. A clamp for engaging a cylindrical body between a pair of generally orthogonally-offset faces of a "V"-block and respective gripping surfaces on gripping surface members of a pair of opposed jaws that are arranged on respective jaw pivots and which further include respective lever arms extending beyond said pivots, with each said lever arm supporting respective cam followers in spaced apart relation from their respective jaw pivots, and wherein said clamp further includes movable cam surfaces which are adapted to act on said cam followers to rotate said lever arms and associated jaws about said pivots to move said gripping surfaces in and out of a three-way engagement wherein said cylindrical body is engaged between said surfaces and said "V"-block.

21. The clamp according to claim 20, wherein said each of said orthogonally-offset faces is arranged in generally parallel, mutually-opposed relation to a corresponding gripping surface on a gripping surface member, and said "V"-block is mounted on a "V"-block pivot and is rotatable about same to permit said cylindrical body to be engaged in self-centering relation between said faces and said surfaces.

22. The clamp according to claim 20, wherein said cam surfaces are side walls of a milled track arranged in a slide plate which is selectively movable between positions corresponding to said gripping surfaces being, respectively, in and out of said three-way engagement with said cylindrical body.

23. The clamp according to claim 22, wherein said cam surfaces comprise a primary portion that is configured to translate through said cam followers and said lever arms, to rapidly move said jaws towards engagement with a lower mechanical advantage; and, a secondary portion that is configured to translate through said cam followers and said lever means to more slowly move said jaws into said engagement, with greater mechanical advantage.

24. The clamp according to claim 23, wherein said plate is selectively driven by a pneumatic piston.

25. The clamp according to claim 24, wherein said plate, said lever arms, and said cam followers are enclosed within a housing, with said "V"-block and said gripping surface members arranged externally thereof, and wherein a central resilient cylindrical seal is arranged generally tangentially against said jaws, between said jaw pivots, to thereby reduce ingress of debris into said housing.

26. The clamp according to claim 25, wherein respective ones of outboard cylindrical seals are arranged generally tangentially between corresponding ones of said jaws, and adjacent portions of said housing, to thereby reduce ingress of debris into said housing.

27. Apparatus for reconditioning a MIG welding torch, said torch having a gas shield including an opening therein through which gas is exhausted from the torch and an interior surface to which back-splash deposits are adhered during operation of the torch, said apparatus comprising:
  a reaming tool receivable within the opening of the gas shield and moveable relative to said gas shield into contact with deposits on the interior surface thereof to facilitate removal of the deposits from said gas shield;
  a motor operatively connected to the reaming tool for driving movement of the reaming tool relative to said gas shield;
  a transmission shaft at least in part operatively connecting the reaming tool and the motor, at least a portion of the transmission shaft being exposed to deposits removed from the gas shield by said reaming tool; and
  a gas flow path for directing pressurized gas against said portion of the transmission shaft to direct deposits removed from said gas shield generally away from said portion of the transmission shaft.

28. Apparatus as set forth in claim 27 wherein said apparatus further comprises a housing having an opening therein, the transmission shaft being at least partially disposed within said housing and extending outward of the housing through said opening whereby said portion of the transmission shaft is disposed exterior of the housing, said housing further having at least one vent opening through which pressurized gas is exhausted from the housing, said housing and at least one vent opening at least partially defining the gas flow path, the at least one vent opening being oriented and configured to direct pressurized gas exhausted from the housing through the at least one vent opening against said portion of the transmission shaft to thereby direct deposits removed from the gas shield away from the housing.

29. Apparatus as set forth in claim 28 further comprising at least one seal forming a seal between said portion of the transmission shaft and the housing, the at least one vent opening being oriented and configured to direct pressurized gas exhausted from the housing through the at least one vent opening toward said portion of the transmission shaft proximal to said at least one seal.

30. Apparatus as set forth in claim 28 the transmission is shaft is translatable relative to the housing to position the reaming tool within the opening of the gas shield.

31. Apparatus as set forth in claim 28 further comprising a support for supporting the motor, said support having at least one channel formed therein and partially defining said gas flow path.

32. Apparatus as set forth in claim 31 wherein the support and the motor are at least partially disposed within the housing, the support being translatable within the housing to translate the motor, transmission shaft and reaming tool relative to the housing to position the reaming tool within the opening of the gas shield.

33. Apparatus as set forth in claim 32 further wherein the gas flow path is a first gas flow path, said apparatus comprising a second gas flow path for directing pressurized gas to drive translation of the support within the housing.

34. Apparatus as set forth in claim 33 wherein the support is a cradle.

35. Apparatus as set forth in claim 27 further comprising a third gas flow path at least partially seperate from said first and second gas paths for directing pressurized gas to the lift to translate the lift relative to the housing to thereby translate the reaming tool outward of the opening in the gas shield.

36. Apparatus for reconditioning a MIG welding torch, said torch having a gas shield including an opening therein through which gas is exhausted from the torch and an interior surface to which back-splash deposits adhere during operation of the torch, said apparatus comprising:

a housing;

a reaming tool receivable within the opening of the gas shield and moveable relative to said gas shield into contact with deposits on the interior surface thereof to facilitate removal of the deposits from said gas shield;

a pneumatically driven motor disposed at least partially within the housing and being operatively connected to the reaming tool for driving movement of the reaming tool relative to said gas shield into contact with said deposits;

a lift disposed at least partially within the housing and being translatable relative thereto, said lift supporting the motor and reaming tool for conjoint translation with the lift generally on a common axis to position the reaming tool within the opening of the gas shield;

a first gas flow path within the housing for directing pressurized gas to the lift to translate the lift relative to the housing; and a second gas flow path within the housing at least partially separate from the first gas flow path for directing pressurized gas to the motor for operating the motor to drive movement of the reaming tool relative to the gas shield into contact with the deposits on the interior surface of said gas shield.

37. Apparatus as set forth in claim 36 wherein the lift at least partially defines said first gas flow path and further at least partially defines said second gas flow path.

38. Apparatus as set forth in claim 37 the lift and housing together at least partially define the second gas flow path for directing pressurized gas to the motor throughout substantially a full range of translation of the lift relative to the housing.

39. Apparatus as set forth in claim 38 wherein the lift forms a sliding, generally air-tight seal with the housing to separate the first and second gas flow paths within the housing.

40. Apparatus as set forth in claim 39 wherein the lift comprises a pair of sealing surfaces spaced from each and forming air-tight seals with the housing, the lift being spaced from the housing generally between said sealing surfaces to form a channel in fluid communication with the motor to at least partially define said second gas flow path separate from said first gas flow path, the housing having an inlet opening in fluid communication with said channel for receiving pressurized gas into said second gas flow path, said channel being in fluid communication with said inlet opening throughout the full range of translation of the lift within the housing.

41. Apparatus as set forth in claim 37 wherein the lift comprises a cradle within the housing for supporting the motor and reaming tool, said cradle being slidable within the housing in response to pressurized gas being delivered to the cradle via the first gas flow path.

* * * * *